Figure 1:
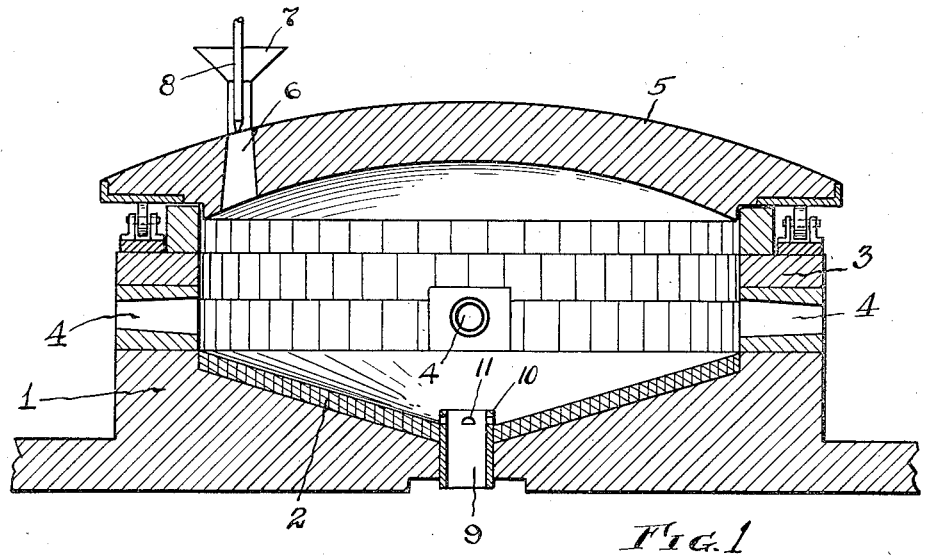

June 19, 1934.                G. H. McINTYRE ET AL                1,963,910
METHOD OF MAKING VITREOUS MATERIALS
Filed Jan. 15, 1932

INVENTORS
Glenn H. McIntyre and
BY  Robert W. Stuart.

Fay, Oberlin & Fay
ATTORNEYS.

Patented June 19, 1934

1,963,910

UNITED STATES PATENT OFFICE 1,963,910

METHOD OF MAKING VITREOUS MATERIALS

Glenn H. McIntyre and Robert W. Stuart, Cleveland, Ohio, assignors to Ferro Enamel Corporation, Cleveland, Ohio, a corporation of Ohio Application January 15, 1932, Serial No. 586,802

4 Claims. (Cl. 49—56)

This application is a continuation, in part, of our co-pending application Ser. No. 473,210 filed August 5, 1930.

This invention relating, as indicated, to method of making glass or vitreous enamels, has specific reference to method for continuously melting the materials employed for making such glass or enamels. As is well known to those familiar with the art of glass or enamel manufacture, vitreous enamels are vitreous glass made opaque by the addition of opacifying material to the mix for a clear glass. Considerable difficulty is experienced in the manufacture of opaque enamels in order to obtain a consistent distribution of the opacifying ingredients in the resulting enamel after the materials, from which such enamels are made, have been melted in the melting furnaces or kilns. The method or methods heretofore employed for melting the materials used in the manufacture of vitreous enamels has been to dump a considerable quantity of such materials onto a sloping floor of a frit kiln and to then melt down such mass and to permit the enamel, as it melts, to run into a fining chamber or to immediately discharge the same into a water bath.

Among the ingredients employed in the manufacture of vitreous enamels the following usually occur: feldspar, quartz, borax, soda ash, zinc oxide, sodium nitrate, bone ash, flourspar, cryolite, antimony oxide, and litharge. As is very apparent, when a pile of material containing the above ingredients is subjected to a high temperature, some of such materials, namely borax, soda ash, sodium nitrate, and others, will flux out at low temperatures before the other ingredients are melted. Consequently, some of the materials will separate and flow away from the mass before others, resulting in inconsistency in the quality of the frit produced by this process and also a marked streaking of such frit due to uneven distribution of the opacifying materials.

It is among the objects of our invention to provide a method for melting the materials from which vitreous enamels are formed by progressively depositing a relatively thin layer of such materials on the floor or bed of the melting furnace, so that all of the materials will be melted more quickly, so as to eliminate all possibilities of separation. By distributing the material to be melted in a thin layer over the bed of the melting chamber, other advantages will be obtained which will appear as the description proceeds.

A further disadvantage of methods for melting vitreous enamels operating on the batch theory, is that, by the injection of a relatively large quantity of material to the furnace, the temperature of the melting chamber is appreciably reduced, which reduction in temperature has a harmful influence on the frit produced by such process. Any process of manufacture which is continuous in operation rather than intermittent has long been recognized as the most advantageous method to employ, so that the method comprising our invention accomplishes other objects, believed to be so well known that a reiteration thereof at this point is unnecessary. To the accomplishment of the foregoing and related ends, said invention, then consists of the steps hereinafter fully described and particularly pointed out in the claims.

The annexed drawing and the following description set forth in detail one mode of carrying out the invention, such mode illustrating, however, but one of various ways in which the principle of the invention may be used.

Figure 2:
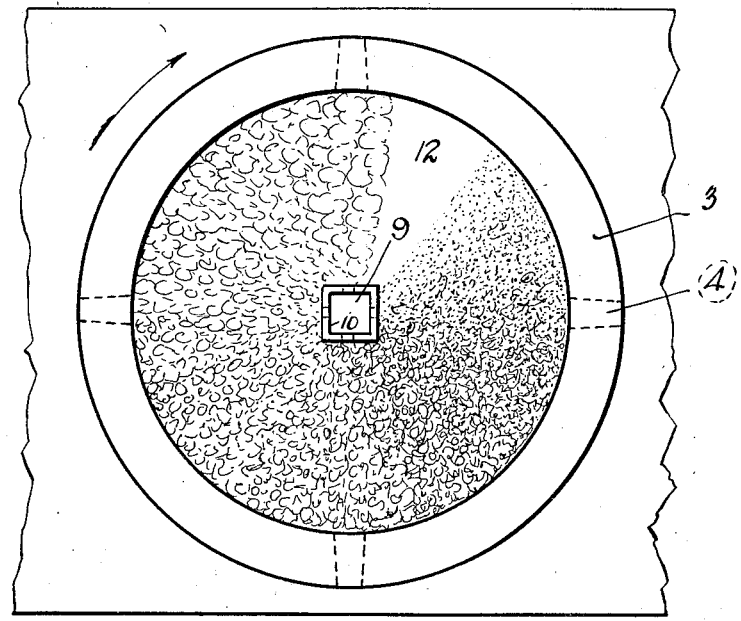

In said annexed drawing:

Fig. 1 is a transverse sectional view of one form of apparatus which may be employed for the purpose of carrying forth the steps comprising our invention; Fig. 2 is a plan view of the melting furnace bottom showing the material deposited thereon in accordance with the principles of our invention.

The method comprising our invention may best be understood by having reference to the drawing in which is illustrated one form of apparatus which may be employed for the purpose of carrying forth the method hereinafter more fully described. Such apparatus consists of a melting furnace, generally indicated at 1, which consists of a coniform bottom 2 surrounded by an annular wall 3 which may be provided with a plurality of circumferentially spaced orifices 4 into which burners may project for the purpose of supplying heating flame to the interior of the furnace. Rotatably mounted on the wall 3 is a cover 5 which is provided with a material-introducing orifice 6.

The material to be melted is fed onto the sloping bottom 2 by introducing such material through a feed chute 7 and then blowing the material into the chamber by means of an air blast supplied by a conduit 8. The feed chute 7 is preferably constructed in the form of a Venturi tube and the nozzle for supplying the air blast is positioned preferably at or below the throat of such tube. The air blast supplied by the conduit 8 is effective not only to carry the material into the furnace and deposit the same on the sloping bottom 2 but is also effective to prevent the hot gases from passing upwardly through the feed chute 7 which would, in a measure, prevent the feeding of the finely divided raw materials.

For the purpose of augmenting the heating effect of the burners projected through the orifices 4, we may employ a combustible gas as the blast supplied by the conduit 8 for feeding the material. When a combustible gas is employed for feeding purposes, the combustion of such gas takes place directly over the area of the raw material introduced and tends to maintain more uniform the temperature within the melting chamber.

The sloping coniform bottom 2 of the furnace 1 is centrally provided with an aperture, generally indicated at 9, about which is positioned a baffle 10 provided with discharge orifices 11. The baffle 10 is provided for the purpose of forming a pool of melted material adjacent the outlet orifice 9 for such material and the orifices 11 will preferably be of a size so that a substantial pool defined by the vertical extent of the baffle 10 is formed around the discharge opening. The melted materials running off from the sloping bottom 2 must, therefore, pass through this pool of melted material and such action is effective to superficially fine the material and cause a mixing thereof so that the molten material flowing down through the orifice 9 into the fining chamber will be homogeneous in character.

The manner in which the material is fed to the floor or bottom 2 of the melting chamber is most clearly illustrated in Fig. 2. The rotor top 5 carrying the material feeding means will preferably move in the direction indicated by the arrow on Fig. 2. When the rotor top moves in this direction, the feeding means is effective to progressively spread successive layers of raw material onto the bottom 2 of the furnace. By properly controlling the rate of feed of the material as well as the rate of rotation of the top 5 carrying the feeding means, it is possible to have the material previously deposited on the area 12 forwardly of the area of the furnace bottom 2 to which the raw material is being supplied, completely fused and/or melted before a new layer of material is deposited thereon by the feeding means as the top 5 rotates.

When the material is deposited on the sloping bottom of the melting chamber in the manner above defined, the possibility of the different constituents separating as the material melts is reduced to a minimum. The material being deposited in relatively thin uniform layers will enable the melting operation to proceed at the fastest possible rate and the material collecting in the pool adjacent the discharge opening in the bottom effects a superficial fining of such material before the same is discharged into the fining chambers which will preferably be positioned beneath the furnace 1. The continuous feed of the material at a rate which is capable of being maintained substantially uniform likewise enables the operation to be carried forth at a substantially uniform temperature, which is not possible when the batch process is employed.

There are other advantages incidental to practicing the method comprising this invention which we believe to be so apparent to those familiar with the art that a further enumeration thereof is not necessary.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:

1. In the making of glass and the like by fusion of raw materials, the steps which comprise progressively spreading a thin layer of said raw materials on a flat surface exposed to heat of a temperature to reduce said raw material to a molten condition, and collecting the resultant melt.

2. In the method of making glass and the like by fusion of raw materials, the steps which comprise progressively spreading a plurality of thin successive layers of such raw materials on a supporting surface, subjecting such surface to sufficient heat to reduce each layer of such raw material to a molten condition before the next is deposited, and collecting the resultant melt.

3. In the method of making glass and the like by fusion of raw materials, the steps which comprise progressively spreading a plurality of thin successive layers of such raw materials on an inclined supporting surface, subjecting such surface to sufficient heat to reduce each layer of such raw material to a molten condition before the next is deposited, and impounding in a pool the melted material running off from said inclined surface.

4. In the method of making glass and the like by fusion of raw materials, the steps which comprise progressively spreading a plurality of thin successive layers of such raw materials on an inclined supporting surface, by means of a gaseous blast subjecting such surface to sufficient heat to reduce each layer of such raw material to a molten condition before the next is deposited, and impounding in a pool the melted material running off from said inclined surface.

GLENN H. McINTYRE.
ROBERT W. STUART.